H. W. LIGON.
AUTOMATIC CUT-OFF VALVE FOR PNEUMATIC COTTON ELEVATORS.
APPLICATION FILED JULY 6, 1911.
1,022,635.
Patented Apr. 9, 1912.
3 SHEETS—SHEET 1.
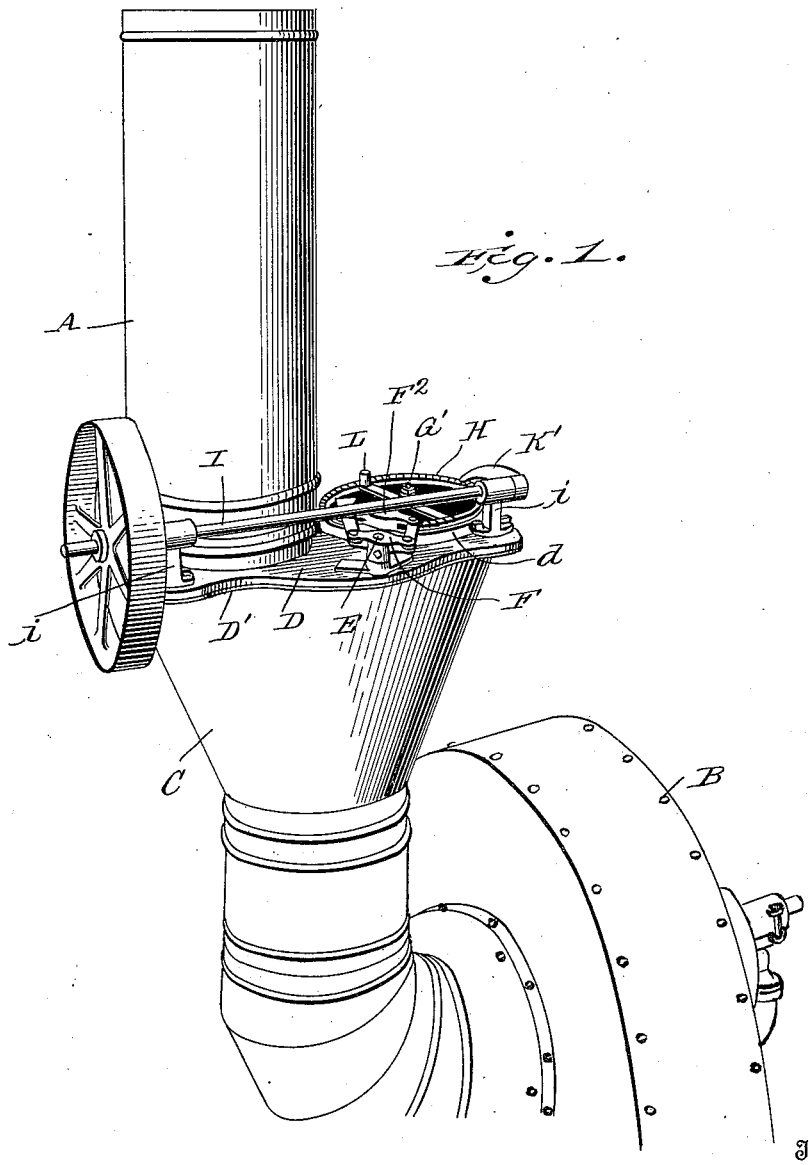

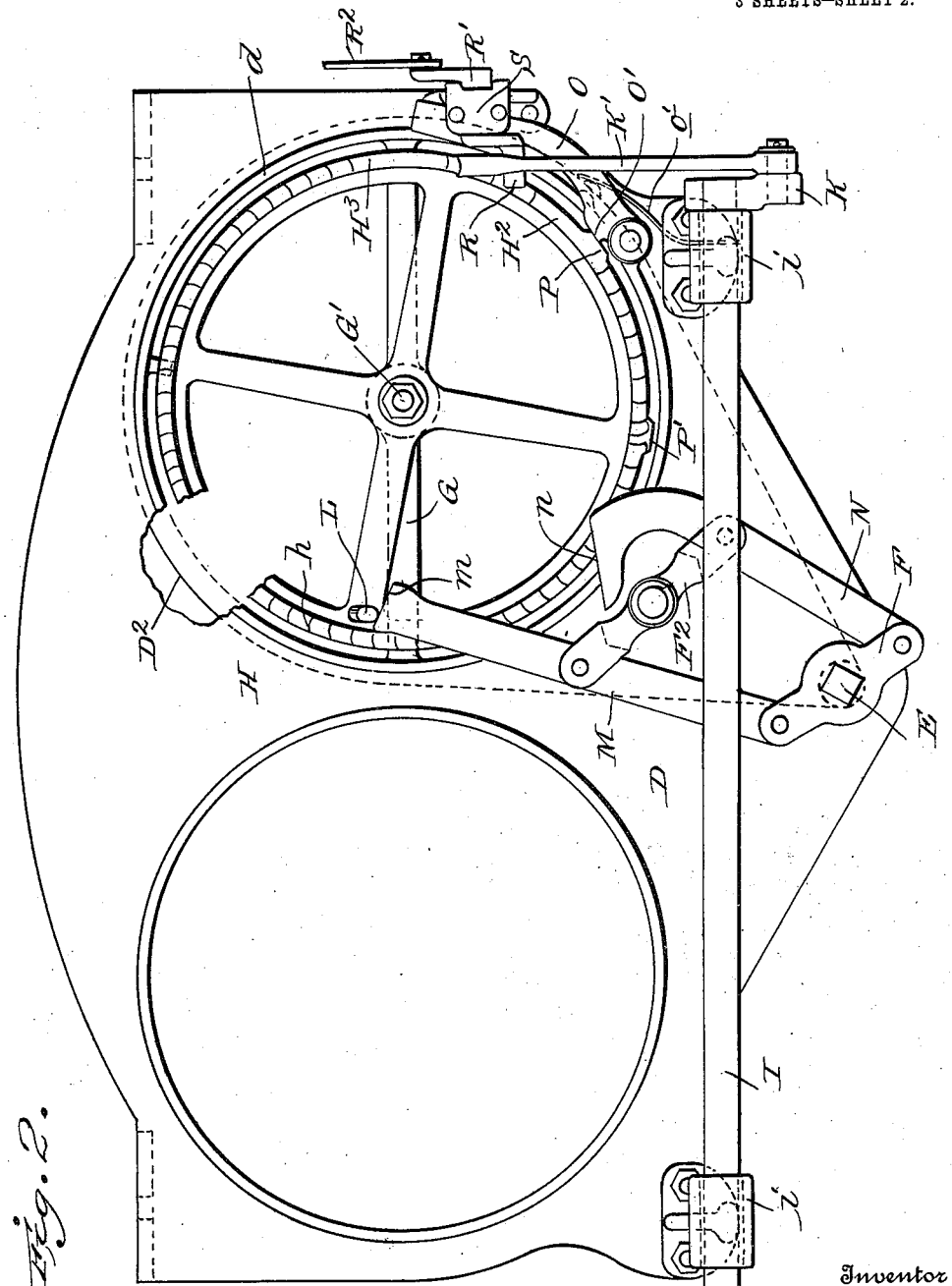

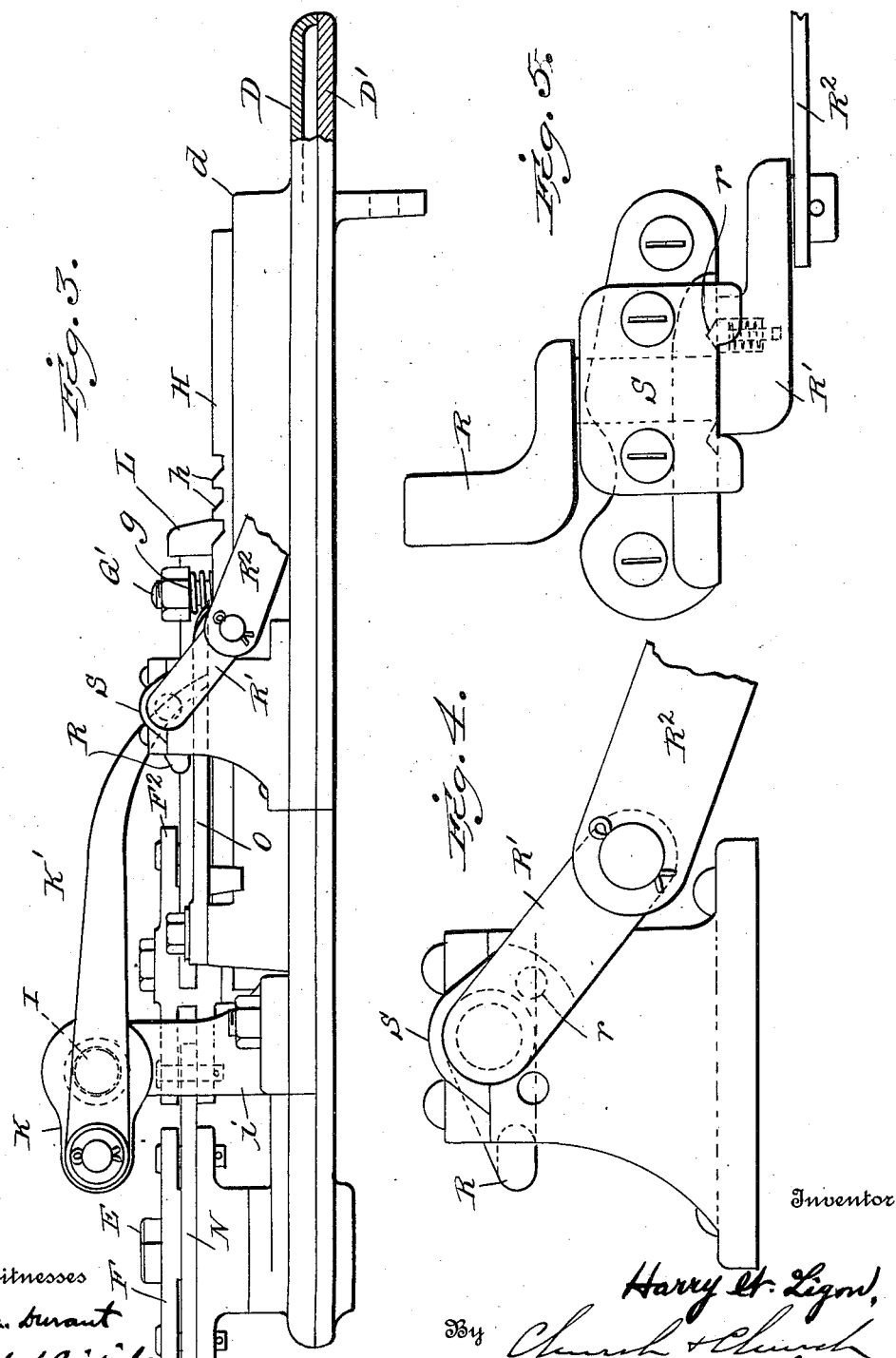

UNITED STATES PATENT OFFICE.

HARRY W. LIGON, OF ATLANTA, GEORGIA.

AUTOMATIC CUT-OFF VALVE FOR PNEUMATIC COTTON-ELEVATORS.

1,022,635.  Specification of Letters Patent.  Patented Apr. 9, 1912.

Application filed July 6, 1911. Serial No. 637,143.

*To all whom it may concern:*

Be it known that I, HARRY W. LIGON, a citizen of the United States, residing at Atlanta, in the county of Fulton and State of Georgia, have invented certain new and useful Improvements in Automatic Cut-Off Valves for Pneumatic Cotton-Elevators; and I do hereby declare the following to be a full, clear, and exact description of the same, reference being had to the accompanying drawings, forming a part of this specification, and to the figures and letters of reference marked thereon.

This invention relates to automatic cut-off or controlling valves adapted for use in connection with pneumatic cotton conveying chutes or receivers for elevating, conveying and distributing the cotton from a wagon or store-house to the cotton gins. In elevators and distributers of the type to which the present invention is particularly adapted, an exhaust fan is usually employed for creating the suction through the chute or conveyer conduit, and the gins to which the cotton is supplied are usually arranged in series. With such a plant successful and economical operation requires that the movement of air and cotton through the conveyer pipe shall be periodically interrupted in order to discharge the cotton into the gin feeders and the interruption is preferably of such a character as to cause a rebound in the column of air, whereby a more effectual discharge of the cotton is effected. It is also desirable, and in fact, essential for economical operation that provision shall be made whereby when the flow of air through the conveyer conduit is interrupted, a corresponding admission of air shall occur beyond the point of cut-off or interruption, so as to keep the exhaust fan properly supplied with the requisite amount of air, both for the purpose of protecting the fan and its driving mechanism and for the purpose of supplying air to the exhaust side of the fan for use as a seed conveying means, or for other purposes to which the air under pressure may be applied.

The present invention has for its object to provide an improved form of automatic cut-off valve which will accomplish all of the objects above set forth, which valve shall be entirely automatic in its action and operate to quickly close and open the exhaust from the chute with a corresponding opening or closing of the auxiliary intake, provision being made whereby when the valve has effected its movement in either direction the necessary dwell may occur for maintaining the flow through either the chute or conduit or the auxiliary intake.

A further object of the invention is to provide a valve which will be simple and cheap in its construction, not liable to get out of order, and which shall have a capacity for manual control whereby the operation of the valve may be temporarily interrupted as is necessary, for instance, where it is desired to gin the remnant of a bale or batch of cotton before a new batch is admitted to the gins.

Referring to the accompanying drawings,—Figure 1 is a perspective view of an automatic cut-off valve embodying the present improvements, together with a portion of the exhaust end of the conveyer chute or conduit, and the exhaust fan for creating suction through the conduit; Fig. 2 is a plan view of the valve operating mechanism with a part broken away to show the gate or valve, the outline of which is indicated in dotted lines; Fig. 3 is an elevation looking at the right hand end of the parts shown in Fig. 2; Fig. 4 is an elevation of the pawl lift for the manual control of the operating mechanism for the valve; and Fig. 5 is a top plan view of the parts shown in Fig. 4.

Similar letters of reference in the several figures indicate the same parts.

Referring particularly to Fig. 1, the letter A indicates the exhaust end of a pneumatic cotton conveyer chute, B an exhaust fan of ordinary construction, and C the connections between the chute A and fan B. The connection C is preferably a Y or funnel-shaped connection into which the chute A opens and having at one side of said chute an auxiliary air intake which, when fully open, is sufficiently throttled to maintain a substantially uniform load on the fan, even though the chute be completely closed.

Between the connection C and chute A the valve of the present invention is interposed. The valve itself is preferably a pivoted valve adapted to move edgewise across the opening between the chute and connection C, or when moved in the opposite direction, to bridge and completely close the auxiliary intake. In the preferred construction a valve casing is formed by castings or plates D, D′, providing between them a narrow space in which the valve $D^2$ is adapted to work. The valve is mounted upon a vertical shaft E journaled in the plate D and squared at its upper end for the reception of a cross head F by which the valve is swung to the right or left through mechanism to be now described.

Bridging the auxiliary intake opening is a cross piece or spider G forming the support for a vertical shaft or bolt G' upon which is journaled a ratchet wheel H, having upon its periphery, but extending parallel with the axis, ratchet teeth $h$, the web of the wheel being cut away to afford the necessary openings for the admission of air to the auxiliary intake. The periphery of the ratchet wheel may conveniently travel in proximity to an annular flange $d$ on the plate D and in order to hold said wheel down to its position and prevent overthrow of the same when in operation, a coil spring $g$ mounted on the shaft or bolt G' is interposed above the wheel and exerts a constant downward pressure thereon.

For operating the ratchet wheel, a constantly driven power shaft I journaled in bearings $i$ on the base plate D, is provided at one end with a crank K adapted to pivotally support one end of a relatively long operating pawl K', the opposite end of which is adapted to engage the ratchet teeth $h$ of the wheel H. The coöperating faces of the ratchet teeth and pawl are preferably convex and concave, respectively, as shown in Fig. 2, whereby a smooth bearing is afforded during the advance movements of the parts.

The ratchet wheel is provided with an upwardly extending stud or projection L, adapted during the rotation of the ratchet wheel to strike and operate successively shifting arms connected with opposite ends of the cross head F. These shifting arms indicated by the reference letters M and N, respectively, are guided and supported by an intermediate idler cross head $F^2$, the arm M having at its end a substantially transverse bearing surface $m$ against which the projection L will strike, and the arm N having at its end an inclined bearing surface $n$, against which the projection L will strike, the arrangement being such that upon the movement of either arm by the projection L, the arm will be advanced, thereby turning the shaft E, and valve attached thereto, whereupon the projection L will move out of engagement with the arm. The length of the shifting arms is such that when one is moved out of the path of the projection L the other will be moved into the path of said projection, thus the projection in its travel will operate the arms alternately, and by properly positioning the arms with relation to the operating projection, or by properly manipulating or moving the ratchet wheel itself, or both, it is obvious that the valve may be caused to move quickly from one position to the other, and that any desired dwell or period of rest may be allowed between movements of the valve.

In the preferred construction the arrangement is such that a single forward movement of the pawl or one-half of a rotation of the operating shaft I will effect a complete movement of the valve from one position to the other and the period of dwell with the valve closing the suction end of the conveyer chute is made very short as compared with the period of dwell when the said chute is opened and the valve is in position to close the auxiliary intake.

Obviously the ratchet wheel should be rotated comparatively slowly during the period of dwell and quite rapidly during the shifting of the valve, and to accomplish these ends the ratchet teeth $h$ are arranged quite close together, and provision is made whereby the pawl will normally engage each succeeding tooth during a portion only of each forward movement for advancing the wheel during the periods of dwell of the valve, but during the periods of movement of the valve said pawl is in engagement with the ratchet wheel during its full forward stroke. To hold the pawl out of engagement with the ratchet wheel, except during such portion of its movement as will advance the wheel one tooth, a shield O is pivotally mounted on the plate D on one side of the wheel flange and is adapted to be swung in under the pawl by a spring indicated at $o'$, the length of the operative end of the shield with which the pawl comes in contact being such that the pawl will ride down off of the shield and engage with the ratchet wheel only during the final portion of its forward movement, or for a distance equal to the space between the operative faces of adjacent teeth. When said shield is retracted, however, as shown in full lines in Fig. 2, the pawl is free to engage the wheel and advance the same at one stroke a distance sufficient to move the valve from one position to the other, thus the valve will be moved during the time it takes the operating shaft to make one-half of a revolution. For automatically retracting the shield, the ratchet wheel is provided at proper points upon its periphery with cam projections P, P' adapted to coöperate with a cam projection O' on the shield O and to swing said shield outwardly or away from beneath the pawl K'. The cam projections P, P' are so positioned upon the ratchet wheel that they will move the shield away from beneath the pawl when the operating projection L has reached a point to engage with the shifting arms. The cam P holds the shield out during the engagement of the projection with the arm M and the cam P' holds the shield out during the time the projection is in engagement with the shifting arm N, said shield being in operative position at all other times in order to reduce the rate of movement of the ratchet wheel.

Inasmuch as the pawl makes a long stroke in engagement with the ratchet wheel, while the valve is being shifted, the necessity for providing closely spaced teeth at two points on the periphery of the wheel does not exist and hence at the points indicated by $H^2$ and $H^3$, long teeth are provided, substantially equal in length to the full stroke of the pawl. This provision relieves the rattling of the pawl over the intermediate teeth after the shield is retracted and is conducive to a smooth and comparatively silent action.

Under some circumstances, particularly where it is desired to gin the remnant of a bale or to avoid feeding cotton to the gins during a period when sufficient has been ginned to complete a bale, or for any other reason the action of the valve should be interrupted, the pawl may be elevated and held out of engagement with the ratchet wheel. As a convenient means for accomplishing this, a pawl lift R is journaled in a bearing S at one side of the ratchet wheel and in position to be turned up under and form a support upon which the pawl may ride. Said pawl lift is provided with a crank arm R′ to which a link $R^2$ may be pivotally connected to facilitate manual manipulation, and a spring pin $r$ of known construction is provided for holding the pawl lift in either position to which it may be adjusted.

In operation, the power shaft I is constantly rotated by a belt or other gearing, and the pawl advances the ratchet wheel intermittently one tooth at a time. As the wheel rotates the projection L first comes in contact with the shift arm M, and at the same time the shield is moved out from beneath the pawl. The next forward movement of the pawl advances the ratchet wheel a sufficient distance to shift the valve from the auxiliary air intake to the exhaust end of the cotton conveyer conduit, thereby opening the former and closing the latter. Normally, this movement requires only about one second of time and the action is quick enough to cause an effective rebound of the column of air, so that the feeding of the cotton from the conveyer to the gins is effectually accomplished.

The continued step-by-step movement of the wheel under the influence of the pawl, for a relatively short period, while the conduit is closed and the auxiliary intake open, brings the projection L into contact with the shift arm N, and at the same time the cam P′ moves the shield away from beneath the pawl. The next movement of the pawl advances the wheel and projection in a single stroke sufficiently far to return the valve to its normal position, closing the auxiliary intake and opening the conduit. The cam P′ passes out from behind the cam on the shield and the pawl then continues to move the wheel one tooth at a time until the projection L again reaches a position to engage with the shift arm M. During this time the cotton is being drawn into the conveyer conduit and deposited in position ready for discharge into the gins.

Having thus described my invention, what I claim as new and desire to secure by Letters Patent of the United States, is:

1. In an automatic cut-off valve for suction cotton conveyers, the combination with a valve casing having two openings therein, one adapted to form a part of an exhaust duct from the conveyer conduit, and the other forming an auxiliary air intake, of an edgewise movable pivoted valve, and means for shifting said valve to close either one or the other of said openings embodying a power shaft, a pawl reciprocated by the shaft, a ratchet wheel with which the pawl coöperates and operative connections actuated by the ratchet wheel for moving the valve.

2. In an automatic cut-off valve for suction cotton conveyers, the combination with a valve casing having two openings therein, one adapted to form a part of the exhaust duct from the conveyer conduit, and the other forming an auxiliary air intake, of a substantially flat edgewise movable pivoted valve, and means for shifting said valve to close either one or the other of said openings, embodying a wheel, means for imparting long and short intermittent movements to the wheel, and operative connections actuated by the wheel to shift the valve during the long movements of the wheel.

3. In an automatic cut-off valve for cotton conveyers, the combination with a valve casing having two openings therein in substantially the same plane, one adapted to form part of the exhaust duct from the conveyer conduit and the other an auxiliary air intake, of a flat edgewise movable valve pivotally mounted in the casing, and means for moving said valve to close either one of said openings embodying a wheel, means for imparting long and short intermittent movements to the wheel, a projection on the wheel, and valve shifter arms with which said projection engages during the long movements of the wheel to shift the valve.

4. In an automatic cut-off valve for suction cotton conveyers, the combination with a substantially flat valve casing having two openings therein in substantially the same plane, one adapted to form part of the exhaust duct from the conveyer conduit and the other an auxiliary air intake, of a flat edgewise movable valve pivotally mounted in the casing beneath the openings therein, and means for moving said valve to close either one of said openings, embodying a wheel, means for imparting long and short intermittent movements to the wheel, a projection on the wheel, valve shifter arms pivotally connected with the valve at one end and adapted to project into the path of said projection at the opposite end, the arrangement being such that said projection is brought into engagement with one of said shifter arms during each of the long movements of the wheel.

5. In an automatic cut-off valve for suction cotton conveyers, the combination with a valve casing having two openings therein, one adapted to form part of the exhaust duct from the conveyer conduit, and the other an auxiliary air intake, of a pivoted valve for closing either one or the other of said openings, and means for moving said valve embodying a ratchet wheel, a reciprocatory pawl coöperating with said wheel, and means for periodically holding said pawl out of engagement with the wheel during a portion of the movement of the pawl, whereby long and short intermittent movements may be imparted to the wheel.

6. In an automatic cut-off valve for suction cotton conveyers, the combination with a valve casing having two openings therein, one adapted to form a part of the exhaust duct from the conveyer conduit, and the other an auxiliary air intake, and a pivoted valve for closing either one or the other of said openings, of means for moving said valve to close and open said openings, embodying a ratchet wheel, a reciprocatory pawl coöperating with said wheel, a shield adapted to be interposed between the pawl and wheel whereby the pawl is held out of engagement with the wheel during a portion of its stroke, means controlled by the wheel for retracting said shield and operative connections actuated by the wheel for shifting the valve when the shield is retracted.

7. In an automatic cut-off valve for cotton conveyers, the combination with a valve casing having two openings therein, one adapted to form a part of the exhaust duct from the conveyer conduit, and the other an auxiliary air intake, and a pivoted valve for closing either one or the other of said openings, of means for operating said valve, embodying a ratchet wheel, a reciprocatory pawl coöperating with said wheel, a shield for holding the pawl out of engagement with the wheel, during a portion of its stroke, whereby short intermittent movements may be imparted to the wheel, means controlled by the wheel for retracting said shield whereby long intermittent movements may be imparted to the wheel, a projection on the wheel, and valve shifter arms movable alternately into the path of said projection, the arrangement being such that the projection and arms coöperate to shift the valve during the long movements of the wheel.

8. In an automatic cut-off valve for cotton conveyers, the combination with a valve casing having two openings therein, one adapted to form part of the exhaust duct from the conveyer conduit and the other an auxiliary air intake, and a pivoted valve mounted in the casing and movable to close either one or the other of said openings, of means for operating said valve, embodying a rotary shaft, a pawl reciprocated by said shaft, a ratchet wheel with which the pawl coöperates, a projection on the ratchet wheel, a cross head connected with the valve and shifter arms pivotally connected with said cross heads and adapted to extend into the path of the projection on the wheel whereby said arms will be successively and alternately acted upon by said projection to move the valve first in one direction and then in the other.

9. In an automatic cut-off valve for cotton conveyers, the combination with a valve casing having two openings therein, one adapted to form part of the exhaust duct from the conveyer conduit, and the other an auxiliary air intake, and a valve pivotally mounted in said casing and movable to close either one or the other of said openings, of a valve operating mechanism embodying a reciprocatory pawl, a ratchet wheel with which said pawl coöperates having long and short teeth thereon for imparting long and short movements to the ratchet wheel, a projection on the ratchet wheel, valve shifter arms extending into the path of said projection and connections intermediate said arms whereby when one is retracted the other is projected, and whereby the valve will be shifted first in one direction and then in the other.

10. In an automatic cut-off valve for cotton conveyers, the combination with a valve casing having two openings therein, one forming part of the exhaust duct from the conveyer conduit, and the other an auxiliary air intake, and a valve for closing either one or the other of said openings, of means for operating said valve embodying a ratchet wheel, operative connections actuated by the ratchet wheel for shifting the valve, a reciprocatory pawl coöperating with the ratchet wheel for rotating said wheel intermittently, and a manually controlled bearing for supporting said pawl out of engagement with the ratchet wheel, whereby the movement of the ratchet wheel will be arrested.

11. In an automatic cut-off valve for cotton conveyers, the combination with a valve casing having two openings therein, one adapted to form part of the exhaust duct from the conveyer conduit, and the other an auxiliary air intake, and a valve for closing either one or the other of said openings, of an operating mechanism for said valve, embodying a ratchet wheel, operating connections actuated by the ratchet wheel for shifting the valve, a reciprocatory pawl, and a manually controlled crank arm forming a bearing for supporting said pawl out of engagement with the ratchet wheel, whereby said pawl may be reciprocated without imparting movement to the ratchet wheel.

12. In an automatic cut-off valve for cotton conveyers, the combination with a valve casing having two openings therein, one adapted to form part of the exhaust duct from the conveyer conduit and the other an auxiliary air intake, and a valve for closing either one or the other of said openings, of an operating mechanism for said valve embodying a reciprocatory pawl, a ratchet wheel moved intermittently by the pawl, operative connections actuated by the ratchet wheel for shifting the valve alternately in opposite directions, a shield for supporting the pawl during a portion of its stroke, whereby short intermittent movements may be imparted to the wheel, a cam on the wheel, and a coöperating cam on the shield, whereby the shield is retracted to allow the pawl to impart a long movement to the wheel, the arrangement being such that the valve is shifted during the long movement of the wheel.

HARRY W. LIGON.

Witnesses:
S. L. GARDNER,
W. E. HARRISON.

---

Copies of this patent may be obtained for five cents each, by addressing the "Commissioner of Patents, Washington, D. C."